S. A. DOBYNE.
LOOSE NAILING MACHINE.
APPLICATION FILED NOV. 21, 1910.

1,026,024.

Patented May 14, 1912.

5 SHEETS—SHEET 1.

Witnesses:
George G. Anderson
Harry H. Reiss

Inventor:
Stephen A. Dobyne
By Hugh K. Wagner
His Attorney.

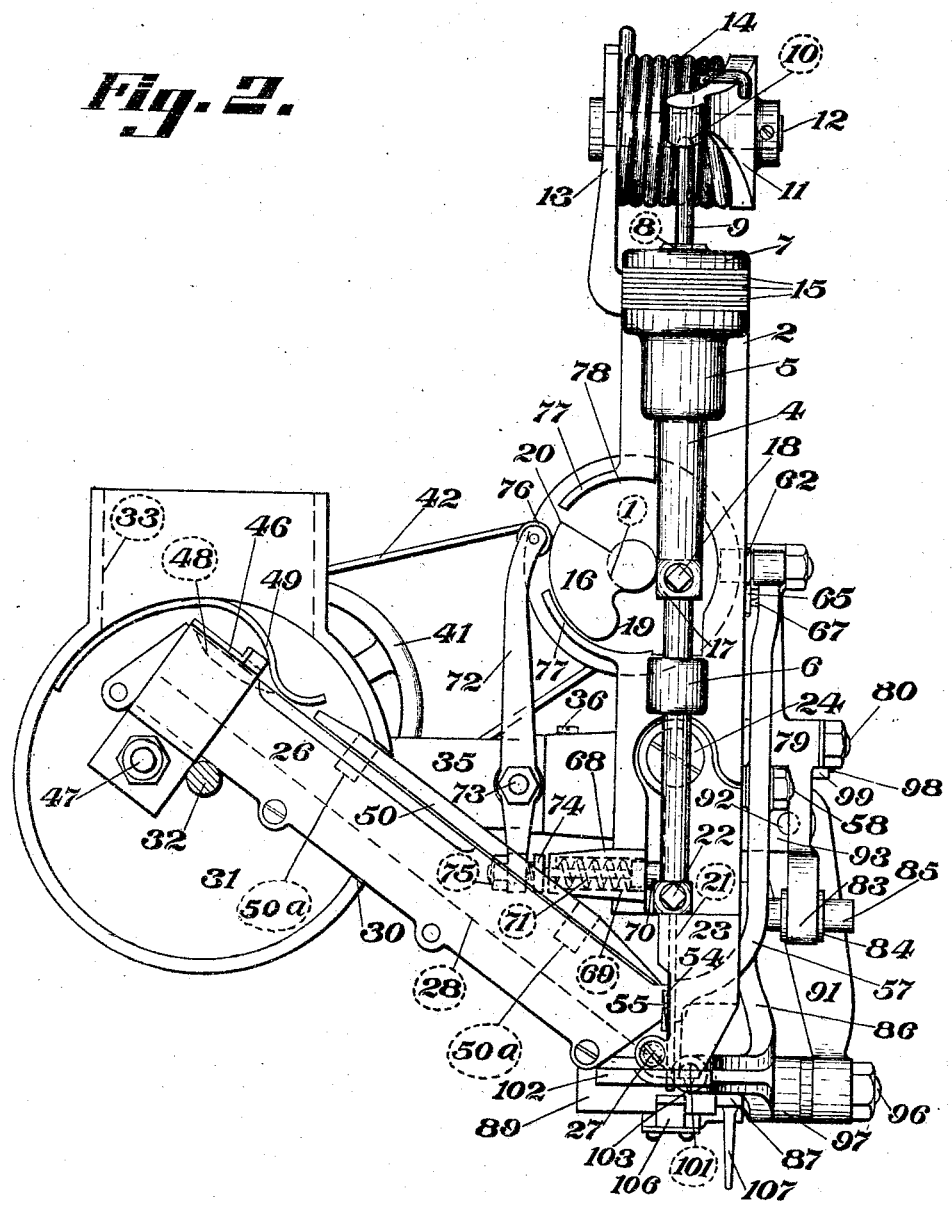

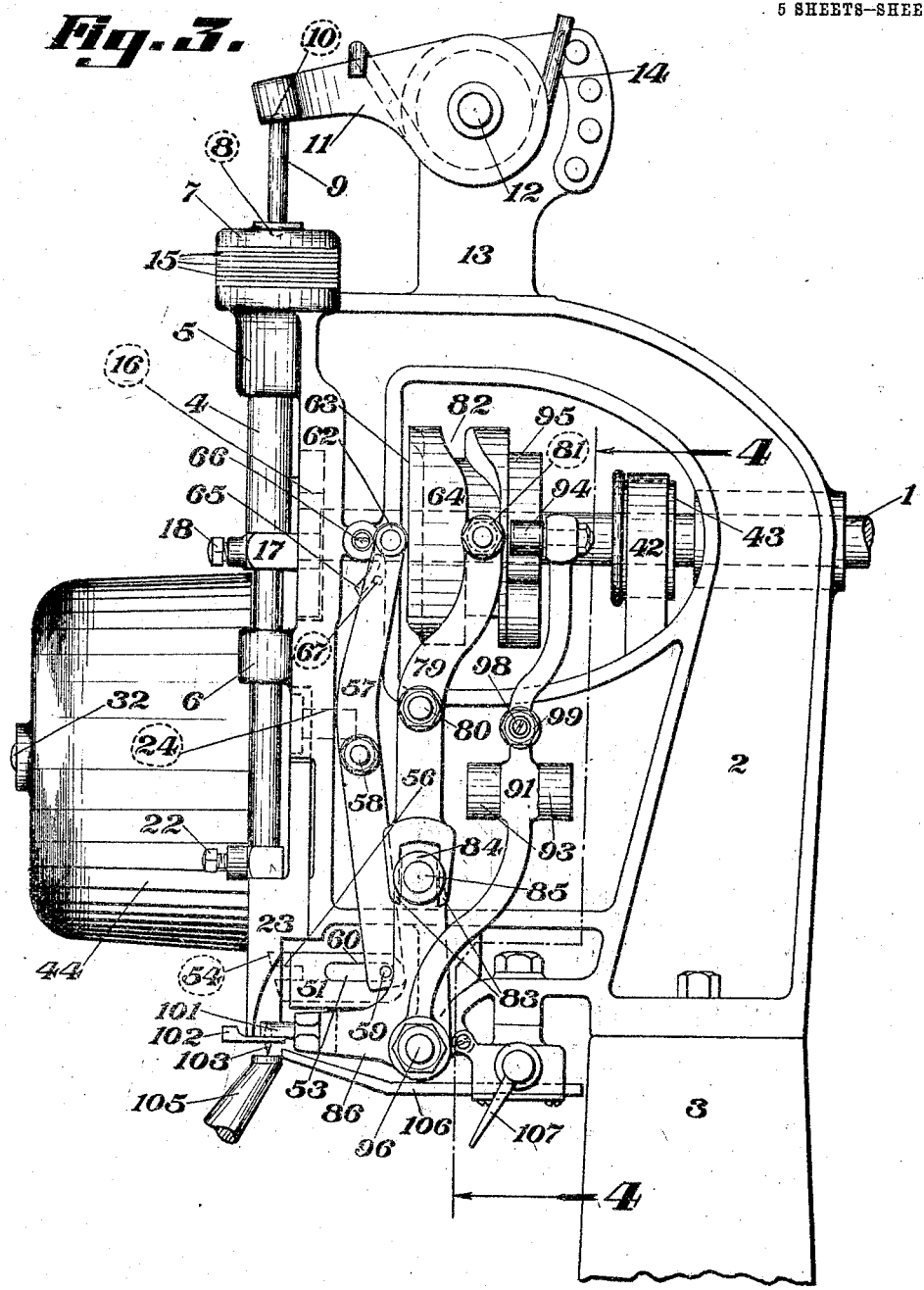

S. A. DOBYNE.
LOOSE NAILING MACHINE.
APPLICATION FILED NOV. 21, 1910.
1,026,024.
Patented May 14, 1912.
5 SHEETS—SHEET 4.
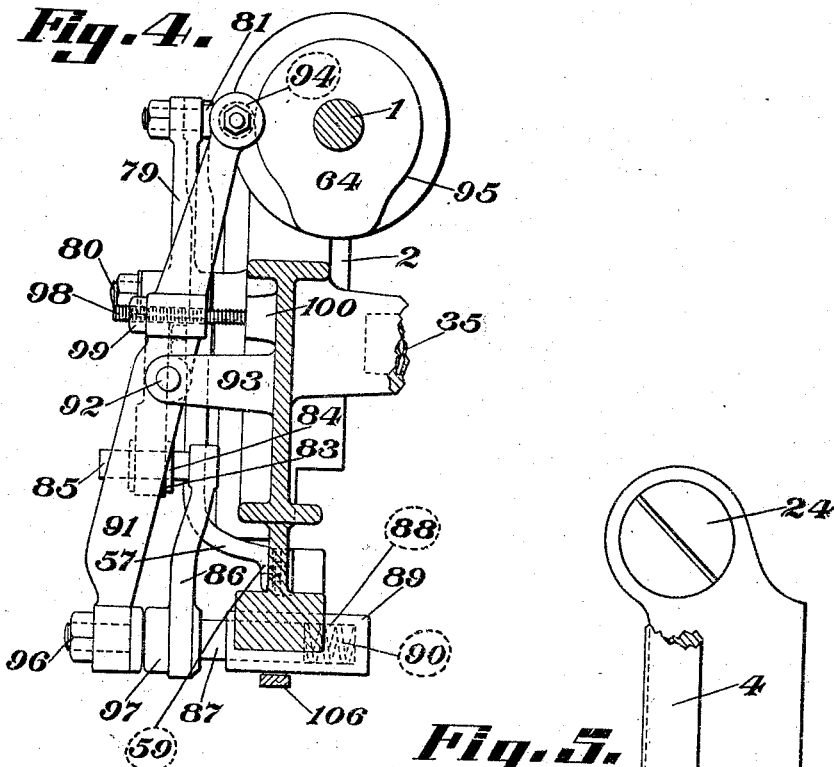
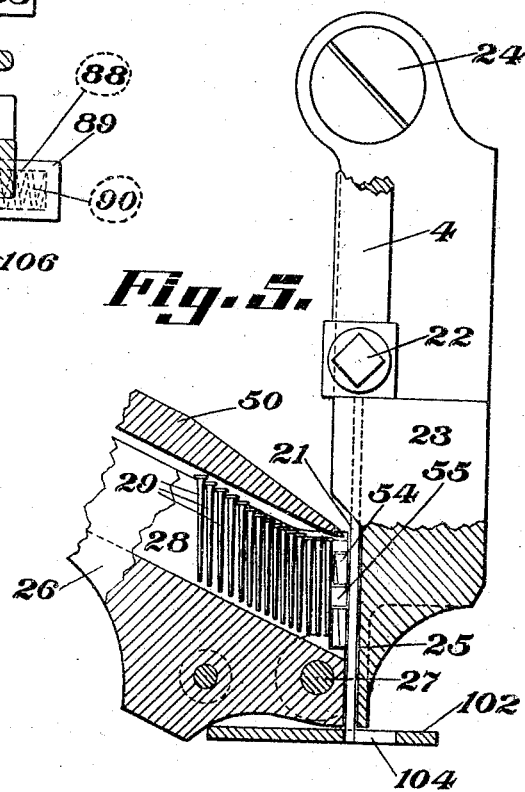
Witnesses:
George G. Anderson
Harry H. Peiss
Inventor:
Stephen A. Dobyne,
By Hugh K. Wagner
His Attorney.

S. A. DOBYNE.
LOOSE NAILING MACHINE.
APPLICATION FILED NOV. 21, 1910.

1,026,024.

Patented May 14, 1912.
5 SHEETS—SHEET 5.

Witnesses:
George G. Anderson
Harry H. Peiss

Inventor:
Stephen A. Dobyne
By Hugh K. Wagner
His Attorney.

UNITED STATES PATENT OFFICE.

STEPHEN A. DOBYNE, OF ST. LOUIS, MISSOURI, ASSIGNOR TO CHAMPION SHOE MACHINERY COMPANY, OF ST. LOUIS, MISSOURI, A CORPORATION OF MISSOURI.

LOOSE-NAILING MACHINE.

1,026,024.  Specification of Letters Patent.  Patented May 14, 1912.

Application filed November 21, 1910. Serial No. 593,330.

*To all whom it may concern:*

Be it known that I, STEPHEN A. DOBYNE, a citizen of the United States, residing in the city of St. Louis, State of Missouri, have invented certain new and useful Improvements in Loose-Nailing Machines, of which the following is a specification.

This invention relates to nailing machines and is an improvement as to certain of its features on the machine shown and described in an application of J. B. Flint, Serial No. 557,642, filed April 26, 1910.

The object of this invention is to provide means for insuring that the throat will be returned to position in the line of drive; to provide means for guiding the picker; and to provide means for preventing the nails from clogging in the chute.

Figure 1:
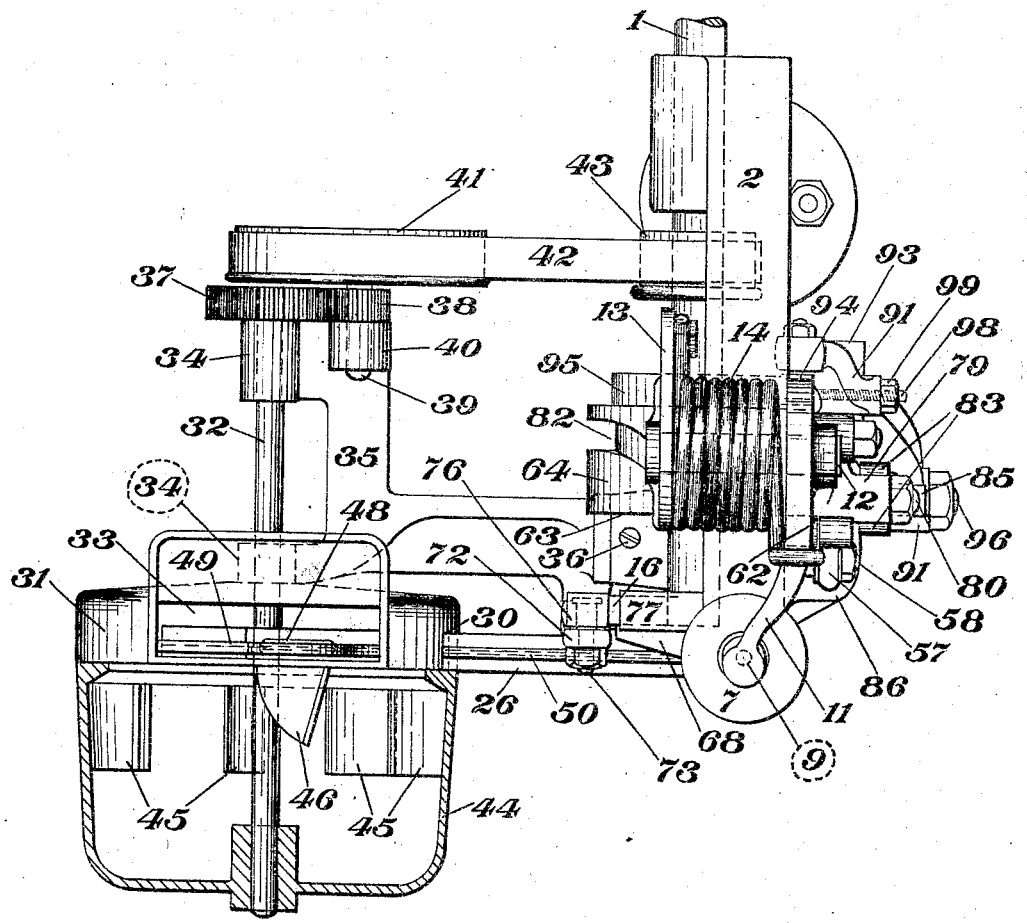
Figure 6:
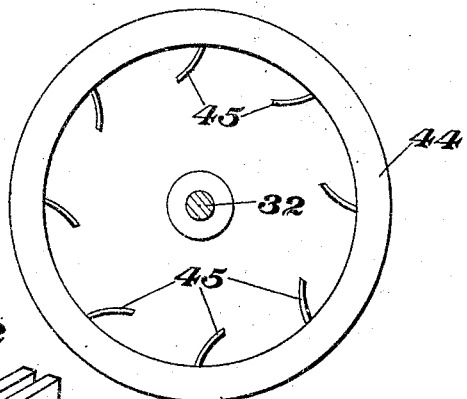
Figure 9:
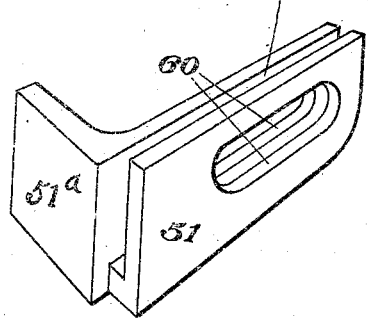
Figure 8:
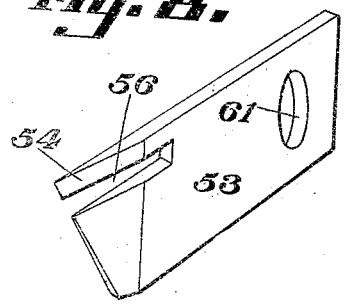
Figure 7:
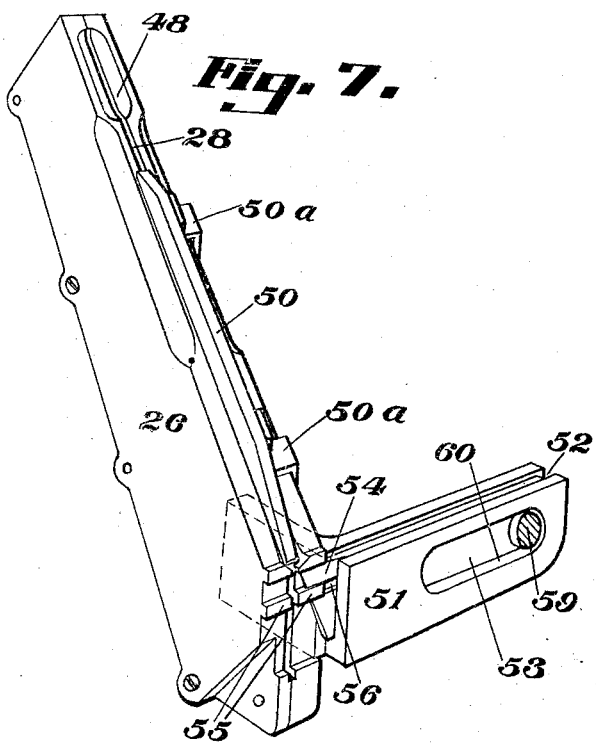

In the accompanying drawings forming part of this specification, in which like numbers of reference denote like parts wherever they occur, Figure 1 is a top plan view of a nailing machine; Fig. 2 is a front elevation of same; Fig. 3 is a side elevation of same; Fig. 4 is a sectional view on the line 4—4, Fig. 3; Fig. 5 is a fragmentary sectional view showing the junction of the nail-chute with the nail guide; Fig. 6 is an interior view of the cover for the nail-containing receptacle; Fig. 7 is a perspective view on an enlarged scale, of the nail-chute and the nail picker attached thereto; Fig. 8 is a perspective view, on an enlarged scale, of the nail picker; and Fig. 9 is a perspective view, on an enlarged scale, of the support for the nail picker.

The drive shaft 1 is journaled in a casting or frame 2, and receives its power from any suitable source, said casting being supported on a suitable base or standard 3. A rod or driver bar 4 preferably extends vertically through openings in lugs 5 and 6 and is adapted to reciprocate therein, said lugs being preferably formed integrally with casting 2 and projecting from the front of same. A head or enlargement 7 is formed on the upper end of a rod or driver bar 4 and contains a depression 8 that forms a seat for the lower end of a pin 9. The upper end of said pin 9 seats in a depression 10 in member 11 borne by shaft 12, said shaft being journaled in bracket 13 borne by casting 2. A spring 14 is coiled around shaft 12 and is arranged to exert its pressure upon member 11 and thereby cause said member to press downwardly upon pin 9 into depression 8 in head 7 so that, when rod 4 is raised in the manner hereinafter described, said rod rocks member 11 upwardly until same is released, whereby member 11 causes said rod to drop under the pressure of spring 14. Leather washers 15, or the like, are interposed between the head 7 of rod 4 and the top of lug 5 in order to lessen the noise, when said rod reaches the end of its downward stroke. The shaft 1 projects beyond the front of casting 2 and bears a cam 16. A collar or member 17 is secured to rod 4 by means of a set-screw 18 and is disposed in the path of rotation of cam 16. The cam 16 is arranged so that, when shaft 1 is rotated counter-clockwise, Fig. 2, the rounded end 19 of said cam engages and raises collar 17, with the result that rod 4 is forced upwardly and is held in its raised position until the corner 20 moves from beneath collar 17, whereby said rod is free to drop under the pressure of spring 14, as hereinabove described. A steel hammer or driver 21 is secured to the lower end of rod 4 by set-screw 22 or other suitable means. A nail guide or throat 23 is pivoted at 24 to casting 2 and contains a groove 25, which forms a driver passage and is arranged to aline with driver 21 in order to allow said driver to pass therethrough, when same descends in the manner hereinabove described.

An inclined nail-chute or raceway 26 is pivotally connected at its lower end to nail guide 23 by means of a screw 27, or the like, and contains a groove or driver passage 28 which registers with the groove 25 in nail-chute 23 in order to deliver the nails to same. The groove 28 extends longitudinally in chute 26 and is formed relatively narrow and deep so as to allow the heads of the nails 29 to rest upon the upper edges of same and, also, to allow the bodies of the nails to hang substantially vertical in said groove, as depicted in Fig. 5. The upper end of chute 26 extends through an opening 30 in an open-ended nail hopper 31 of a nail loader and rests and slides upon shaft 32 that extends through the interior of said nail hopper, said hopper having an opening 33 in the upper part thereof to allow nails to be placed into same. Shaft 32 supports hopper 31, and is journaled in lugs 34 borne by bracket 35 that is secured to casting 2 by a screw 36 or other suitable means. A gear 37 borne by shaft 32 is driven by gear 38 on shaft 39, said shaft 39 being journaled in lug 40 borne by bracket 35. A pulley 41 is mounted on shaft 39 and is driven by belt 42 which receives its power from pulley 43 on drive shaft 1. A cup-shaped receptacle 44 is secured to shaft 32 and bears a plurality of paddles 45 that project inwardly from the inner surface thereof. As the receptacle 44 rotates the paddles 45 raise the nails 29 in said receptacle and discharge same upon an inclined chute or plate 46 which is secured to hopper 31 by means of a bolt or screw 47.

Chute 46 is arranged to discharge the nails 29 into a depression 48 in nail-chute 26, said depression being arranged to guide said nails into the upper end of groove 28 in said chute 26. The nails 29 that enter groove 28 assume an upright position, as hereinabove described, and move downwardly toward the nail guide 23. A spring 49 is secured to the inner wall of hopper 31 and is arranged to bear upon the upper face of the chute, and its function is to prevent clogging of the nails as hereinafter described. A plate or cover 50 is fastened to nail-chute 26 by means of brackets 50ª, or the like, and is arranged to extend longitudinally over and adjacent to groove 28. Said plate preferably extends from the hopper to the lower end of groove 28 and retains the nails 29 in said groove. The lower end of plate 50 is arranged to engage the head of the first nail 29 in the lower end of groove 28, so as to prevent the pressure of the other nails 29 in groove 28 from forcing the first nail out of said groove, and is somewhat resilient in order to allow the first nail to be forced into groove 25 in nail guide 23 in the manner about to be described.

A picker guide 51 is secured to the lower part of nail-chute 26 by means of a flange portion 51ª and contains a groove 52 which preferably extends substantially at a right-angle to the groove 28 in said nail-chute. A nail picker or plate 53 is adapted to reciprocate longitudinally in groove 52 and is provided with a beveled point 54. A pair of tongues 55, or the like, projects from the lower end of nail-chute 26 into an elongated notch 56 in the point 54 and guides the nail picker 53. The picker 53 is arranged to move across the lower end of groove 28 so that the beveled point 54 moves between the first and second nails 29 at the bottom of groove 28 and thereby not only separates the first nail from the other nails in groove 28, but forces the first nail into groove 25 in nail guide 23. Said picker 53 is actuated by means of a lever 57 which is pivoted at 58 to casting 2. One end of lever 57 bears a pin 59, which extends through a slot 60 in member 51 and, also, loosely through an aperture 61 in picker 53, and the other end of said lever bears a roller 62 which is adapted to ride upon a cam surface 63 of member 64 borne by drive shaft 1, said picker being capable of reciprocating on pin 59. A spring 65 is attached to casting 2 by means of a screw or bolt 66 and is arranged to exert its pressure against a pin 67 borne by lever 57 in order to hold roller 62 into engagement with cam surface 63 of member 64. When roller 62 rides from the high side of cam surface 63 to the low side thereof, the lever 57 rotates clockwise, Fig. 3, and thereby moves picker 53 forwardly, with the result that the beveled point 54 moves across the lower end of groove 28, so as to separate the first nail 29 from the second nail in groove 28 and, also, to force the first nail 29 into the groove 25 in nail guide 23. As the roller 62 rides from the low side to the high side of cam surface 63, the lever 57 rocks counter-clockwise, Fig. 3, and thereby moves picker 53 rearwardly so as to move the beveled point 54 away from the groove 28, whereby the downward pressure of the nails 29 in groove 28 force the second nail into engagement with the lower end of plate 50 so that same occupies the position previously occupied by the first nail in order to be forced into groove 25, when said picker again moves forwardly as just described. Member 64 is so arranged relative to cam 16 that when driver 21 is raised the roller 62 rides upon the low side of cam surface 63 in order to force a nail 29 into groove 25, as hereinabove described, but when the driver 21 is lowered the roller 62 rides upon the high side of cam surface 63 so as to move the beveled point 54 of picker 55 away from the groove 28, thereby allowing the nails to descend in said groove.

A lug 68 borne by casting 2 contains an opening 69 through which a pin 70 extends. A spring 71 is arranged to press the head of said pin against one side of nail-guide 23 and thereby tends to rotate said nail-guide counter-clockwise, Fig. 2, in order to hold said nail-guide in position to allow groove 25 to receive driver 21, when the latter descends. The lower end of lever 57 normally engages one side of member 51 and, as said member is secured to nail-chute 26 and said nail-chute is attached to nail-guide 23, the end of said lever limits the movement of nail-guide 23 toward the right, Fig. 3 and locates it in position under the driver. A lever 72 is pivoted at 73 to bracket 35, and affords a means for positively returning and holding nail-guide 23 in position to allow groove 25 to receive driver 21, when same descends. A bolt 74 extends through a screw-threaded opening in one end of lever 72 and bears a lock-nut 75, which affords a means for adjusting said bolt. A roller 76 is attached to the other end of lever 72 and extends through an opening in wall 77 of a depression 78 in casting 2 in order to ride upon cam 16 while the driver 21 descends. The head of bolt 74 engages the end of pin 70 and, when roller 76 rides upon cam 16, said cam tends to rotate lever 72 counter-clockwise, Fig. 2, with the result that said bolt presses against the end of pin 70 so as to cause said pin to return and hold nail-guide 23 in position to allow driver 21 to enter groove 25, when said driver descends. Roller 76 is arranged so that the rounded end 19 of cam 16 engages said roller before the corner 20 of said cam releases the collar 17 in the manner hereinabove described, and, also, so that the corner 20 of said cam moves out of engagement with said roller before nail-guide 23 is rocked toward the left, Fig. 2, in the manner hereinafter described. While driver 21 is held in a raised position, the nail-guide 23 is rocked toward the left, Fig. 2, in the manner about to be described, and after a nail 29 has been deposited into groove 25, said guide is returned to its normal position by the pressure of spring 71 and lever 72 as just described.

A lever 79 is pivoted at 80 to casting 2 and bears a roller 81 which rides in a cam groove 82 in member 64. The prongs 83 of a bifurcated end of lever 79 hold a sleeve 84 upon a pin 85 borne by an arm of bell-crank awl carrier 86, said sleeve being capable of rotating and reciprocating upon said pin. The axle or gudgeon 87 of bell-crank 86 extends into an opening 88 in lug 89 borne by casting 2, and is capable of reciprocating and rotating in said opening. A spring 90 is arranged in opening 88 so as to exert its pressure against the end of gudgeon 87 and thereby tends to force said gudgeon and bell-crank 86 toward the right, Fig. 2. A lever 91 is loosely mounted on a pin 92 that connects a pair of lugs 93 borne by casting 2. One end of lever 91 bears a roller 94 which projects into the path of travel of the high side of cam surface 95 borne by member 64. A bolt 96 is attached to the other end of lever 91 that is arranged to extend adjacent a boss 97 borne by bell-crank 86. The pressure of spring 90 holds boss 97 of bell-crank 86 in engagement with the head of bolt 96 and thereby tends to rotate lever 91 clockwise, Fig. 4, so as to hold roller 94 in the path of rotation of the high side of cam surface 95. A screw 98 extends through a screw-threaded opening in lever 91 and bears a lock-nut 99 which affords a means for holding same firmly in said opening. An end of screw 98 bears against a boss 100 borne by casting 2 and thereby limits the movement of roller 94 toward the cam surface 95. The cam surface 95 is so arranged relative to cam 16 that, while said cam 16 raises driver 21, the high side of cam surface 95 engages the roller 94 and thereby rocks lever 91 clockwise, Fig. 2, whereby said lever forces bell-crank 86 toward the left for the purpose hereinafter described. By means of screw 98 the roller 94 can be adjusted relative to the high side of cam surface 95 in order to increase or diminish the movement of lever 91 and thereby increase or diminish the movement of bell-crank 86.

One arm of the bell-crank awl carrier 86 bears a member 101, which extends beneath nail-guide 23 and above a foot plate 102 that is secured to the casting 2. An awl 103 projects from member 101 into a slot 104 in plate 102, said slot being arranged to register with the bottom of groove 25 in order to allow hammer 23 to pass therethrough, when same descends. An anvil 105 is located beneath groove 25 and slot 104, and not only supports the leather or shoe to be nailed but clenches the points of the nails 29, when said nails are driven through the leather. Part of cam groove 82 extends adjacent the front end of member 64 and another part extends near the rear end of said member. When roller 81 rides from the front side of cam groove 82 into the rear part of same, the bell-crank 86 is rocked counter-clockwise, Fig. 3, with the result that awl 103 is caused to project from slot 104 into the leather upon anvil 105. While the roller 81 rides in the rear part of cam groove 82 the high side of cam surface 95 engages roller 94 and thereby moves the bell-crank 86 toward the left, Fig. 2, as hereinabove described. The awl 103 remains in the leather until bell-crank 86 reaches the end of its movement toward the left as just described, and thereby feeds the leather in the same direction. After bell-crank 86 reaches the end of its movement toward the left, roller 81 rides into the front part of cam groove 82 and thereby rocks said bell-crank clockwise, Fig. 3, so as to withdraw the awl 103 from the leather. When bell-crank 86 moves toward the left as hereinabove described, member 101 engages one side of nail-guide 23 and rocks said nail-guide toward the left until the awl 103 reaches a position in vertical alinement with driver 21. After awl 103 has been withdrawn from the leather and a nail 29 has been deposited into groove 25 in the manner hereinabove described, the roller 94 rides out of engagement with the high side of cam surface 95 so as to allow spring 90 to return bell-crank 86 to its normal position and, also, to allow spring 71 and lever 72 to return the nail-guide 23 to its initial position before the driver 21 is released to descend. The nail guide is arrested in position with the driver passage in alinement with the driver by engagement of the picker guide (attached to the chute and to the nail guide) with the end of picker lever 57. By means of screw 98, the movement of bell-crank 86 can be regulated so that the nails 29 can be driven at any desired distance apart from each other. A guide 106 that is adjustable by a lever 107 or other suitable means projects below plate 102 and regulates the spacing of nails 29 from the edge of the leather.

The operation of the machine is as follows: Power is applied to shaft 1 so that same rotates counter-clockwise, Fig. 2, and thereby revolves cam 16 and member 64 in the same direction. As cam 16 revolves, its rounded end 19 engages and lifts collar 17 which in turn raises rod 4 and driver 21. After driver 21 reaches the end of its upward stroke, collar 17 rides upon cam 16 until the corner 20 of said cam moves from beneath said collar, whereby rod 4 and driver 21 descend under the pressure of spring 14.

While driver 21 is raised the roller 81 rides in the rear part of cam groove 82 and thereby holds bell-crank 86 so as to press awl 103 into the leather below plate 102. The high side of cam surface 95 then engages roller 94 and causes lever 91 to move bell-crank 86 toward the left, Fig. 2, whereby awl 103 moves the leather in the same direction, as hereinabove described, and member 101 rocks the nail-guide 23 toward the left. When nail-guide 23 is rocked, as just described, roller 62 rides upon the low side of cam surface 63 so as to rock lever 57 clockwise, Fig. 3, and thereby move nail picker 53 forwardly, whereby the beveled point 54 of said nail picker forces a nail 29 into groove 25 in the manner hereinabove described. After the bell-crank 86 reaches the ends of its movement toward the left and roller 81 rides into the front side of cam groove 82 so as to rock said bell-crank clockwise, Fig. 3, and thereby withdraw awl 103 from the leather, the high side of cam surface 95 moves out of engagement with roller 94 so as to allow spring 90 to return said bell-crank to its normal position. When said bell-crank returns to its normal position, the spring 71 returns nail-guide 23 to its initial position into alinement with the driver where it is arrested by the picker lever above described. The cam 16 engages roller 76, whereby lever 72 positively returns said nail-guide in its initial position to allow the driver 23 to descend into groove 25, when the corner 20 of cam 16 releases collar 17. Driver 21 then drops upon the nail 29 in groove 25 and drives said nail into the leather upon anvil 105, which clenches the point of same. The driver 21 is then raised and the leather fed toward the left, Fig. 2, as hereinabove described, in order to allow the next nail 29 that is deposited into groove 25 to be driven into the leather, when said driver again descends.

It will therefore be seen that the nail guide or throat is moved in one direction by the awl mechanism and is returned by means of spring 71, and that additional means are provided for insuring the return of the nail guide. The driver cam operates to positively return the nail guide if it should happen to stick, and this positive return is accomplished before the driver is released. Means are therefore provided for moving the nail guide positively in both directions.

During the operation of the machine the nail chute reciprocates in the hopper and the end of the cover 50 will in the movement of the chute rapidly engage and disengage the yielding member or flat leaf spring 49. The rounded end of this spring will thus ride upon the end of the cover and snap back as this end recedes with the chute. The function of the spring is that of a clearer to clear the chute of nails improperly positioned thereon. If any nails become lodged crosswise of the chute, or if they hang by their heads from the end of the cover they will be knocked off by the clearer.

I claim:

1. In a nailing machine the combination of a support, a reciprocating driver, a nail guide pivoted to said support and having a groove to receive said driver, means for rocking said guide in one direction, a cam adapted to actuate said driver, and means actuated by said cam adapted to return said nail guide to its normal position.

2. In a nailing machine, the combination of a support, a reciprocating driver, a nail guide pivoted to said support and having a groove to receive said driver, means for rocking said guide in one direction, a cam adapted to actuate said driver, means for returning said guide to its normal position comprising a plunger, a spring adapted to press said plunger against one side of said nail guide, and a pivoted member actuated by said cam and adapted to hold said plunger against said nail guide, when said cam releases said driver.

3. In a nailing machine, the combination of a support, a nail-chute, a nail guide provided with a groove, a reciprocating picker adapted to feed the nails successively from said chute into said groove, means for rocking said guide in one direction, a reciprocating driver operating in said groove, a cam for actuating said driver, and means actuated by said cam for returning said guide to its normal position.

4. In a nailing machine, the combination of a support, a nail chute, a nail guide provided with a groove, a reciprocating picker adapted to feed the nails successively from said chute into said groove, means for rocking said guide in one direction, a reciprocating driver operating in said groove, means for actuating said driver, and means operated by said actuating means for moving said nail guide in the opposite direction.

5. In a nailing machine, the combination of a support, a nail-chute, a nail guide provided with a groove, a reciprocating picker adapted to remove a nail from said chute and force the same directly into said groove during each movement thereof in one direction, means for moving said guide in one direction, a reciprocating driver operating in said groove, means for actuating said driver, and means operated by said actuating means for moving said nail guide in the opposite direction.

6. In a nailing machine, the combination with a support and a driver thereon, of a nail guide mounted on said support for movement in the line of feed of the work, a nail chute movable with said guide and provided with means for feeding loose fasteners to the guide, independently supported awl mechanism, and means for moving said guide and said awl mechanism in the line of feed and for positively returning said guide.

7. In a nailing machine, the combination with a support and a driver thereon, of a nail guide mounted on said support for movement in the line of feed of the work, a nail chute movable with said guide and provided with means for feeding loose fasteners to the guide, independently supported awl mechanism including an awl movable in the line of feed, and means for moving said guide and awl alternately under the driver constructed to positively actuate said guide in both directions.

8. In a nailing machine, the combination with a support and a driver thereon, of a nail guide mounted on said support for movement thereon, awl mechanism including an awl carrier, operating means constructed to cause the awl carrier to engage and move the guide in one direction, and means for positively moving the guide in the opposite direction.

9. In a nailing machine, the combination with a support and a driver thereon, of a nail guide mounted on said support for movement thereon, awl mechanism, operating means constructed to cause the awl mechanism to engage and move the guide in one direction, and means for positively moving the guide in the opposite direction.

10. In a nailing machine, the combination with a support and a driver thereon, of a nail guide mounted on said support for movement thereon, awl mechanism, operating means constructed to cause the awl mechanism to engage and move the guide in one direction, and yieldingly and positively operated means for moving the guide in the opposite direction.

11. In a nailing machine, the combination with a support, and a driver and a nail loader thereon, of a nail guide mounted for transverse movement on said support, a chute movable with said guide and in said loader, and means for positively moving said nail guide into and out of alinement with said driver.

12. In a nailing machine, the combination with a support, and a driver and a nail loader thereon, of a nail guide mounted for transverse movement on said support, a chute movable with said guide and in said loader, means for positively moving said guide into and out of alinement with said driver, and independently mounted awl feed mechanism including an awl movable into and out of alinement with said driver.

13. In a nailing machine, the combination with a support and a driver thereon, of a nail guide having a driver passage therein and pivoted transversely on said support to swing transversely thereon, and means for positively swinging said guide to move said driver passage into and out of alinement with said driver.

14. In a nailing machine, the combination with a support and a driver thereon, of a nail guide pivoted transversely on said support for transverse movement thereon, means for positively moving said guide into and out of alinement with said driver, and independently mounted awl feed mechanism including an awl movable into and out of alinement with said driver.

15. In a nailing machine, the combination with a support and a driver thereon, of a nail guide mounted on said support for movement thereon into and out of alinement with the driver, a stop for locating the guide in alinement with the driver, and operating means adapted to positively move said guide into engagement with said stop.

16. In a nailing machine, the combination with a support and a driver thereon, of a nail guide mounted on said support for movement thereon into and out of alinement with the driver, a stop for locating the guide in alinement with the driver, and operating means adapted to yieldingly and positively move said guide into engegement with said stop.

17. In a nailing machine, the combination with a stationary frame, a movable fastener chute thereon and a picker extending across said chute, of a picker guide secured to and extending from said chute, and an actuator on said frame and stationary with respect to said chute and guide and having a movable connection with said picker.

18. In a nailing machine, the combination with a stationary frame, a fastener chute movable thereon, and a picker extending across said chute, of a picker guide secured to and extending from said chute, and an actuator mounted on said frame and having a sliding connection with said picker.

19. In a nailing machine, the combination with a stationary frame, a movable fastener chute thereon and a picker extending across said chute, of a picker guide comprising a grooved member secured to and extending from said chute, said groove receiving said picker therein and supporting it laterally, and an actuator on said frame and having a pin thereon extending through a hole in said picker.

20. In a nailing machine, the combination with a support and a driver thereon, of a nail guide mounted on said support for movement thereon into and out of alinement with the driver, a picker for said guide, and a picker actuator adapted to form a stop to locate the guide in its position in alinement with the driver.

21. In a nailing machine, the combination with a support and a driver thereon, of a movable nail guide, and a cam having a cam surface for operating said driver and for moving said guide in timed relation with said driver.

22. In a nailing machine, the combination with a support and a driver thereon, of a movable nail guide, means for moving said guide into and out of alinement with said driver, and an actuator for said driver and for said guide operatively connected with said guide and constructed to insure the movement of said guide into alinement with said driver.

23. In a nailing machine, the combination with a support and a driver thereon, of a movable nail guide, awl mechanism adapted to move said guide in one direction, and an actuator for said driver constructed and arranged to move said guide in the other direction.

24. In a nailing machine, the combination with a support and a driver thereon, of a nail guide, movable into and out of alinement with said driver, awl mechanism adapted to move said guide out of alinement with said driver, and an actuator for said driver constructed and arranged to move said guide into alinement with said driver.

25. In a nailing machine, the combination with a support and a driver thereon, of a movable nail guide, means for moving said guide into and out of alinement with said driver, and additional means coöperating with said first means constructed and arranged to insure the movement of said guide into alinement with said driver.

26. In a nailing machine, the combination with a hopper and a nail chute movable therein, and having a cover extending into said hopper, of a yielding device secured to said hopper adapted to engage the end of said cover during the movements of said chute to clear the chute of misplaced nails.

27. In a nailing machine, the combination with a hopper and a nail chute movable therein, and having a cover extending into said hopper, of a curved leaf spring secured to said hopper and adapted to engage the end of said cover during the movement of said chute to clear the chute of misplaced nails.

In testimony whereof I have hereunto affixed my signature in the presence of two witnesses.

STEPHEN A. DOBYNE.

Witnesses:
GLADYS WALTON,
GEORGE G. ANDERSON.

---

Copies of this patent may be obtained for five cents each, by addressing the "Commissioner of Patents Washington, D. C."